US008548687B2

(12) United States Patent  
Jefferies et al.

(10) Patent No.: US 8,548,687 B2  
(45) Date of Patent: Oct. 1, 2013

(54) VEHICLE SEAT POWER TRACK ENHANCEMENTS

(75) Inventors: Paul J. Jefferies, Ypsilanti, MI (US); Vasile E. Bozintan, Farmington Hills, MI (US); Thomas O. Dobry, South Lyon, MI (US); Richard T. Krause, Brighton, MI (US); Nishide Harutomi, Wako (JP); Ishii Yukihisa, Wako (JP); Honda Hiroyuki, Wako (JP); Uno Koji, Wako (JP)

(73) Assignees: Johnson Controls Technology Company, Holland, MI (US); Honda Motor Co., Ltd., Tokyo (JP)

( * ) Notice: Subject to any disclaimer, the term of this patent is extended or adjusted under 35 U.S.C. 154(b) by 435 days.

(21) Appl. No.: 12/677,243

(22) PCT Filed: Sep. 10, 2007

(86) PCT No.: PCT/US2007/019638  
§ 371 (c)(1),  
(2), (4) Date: Sep. 2, 2010

(87) PCT Pub. No.: WO2009/035431  
PCT Pub. Date: Mar. 19, 2009

(65) Prior Publication Data  
US 2011/0022274 A1 Jan. 27, 2011

(51) Int. Cl.  
*B60R 22/00* (2006.01)

(52) U.S. Cl.  
USPC .............. 701/45; 701/1; 701/49; 296/65.13; 280/735

(58) Field of Classification Search  
USPC .............. 701/45, 1, 49; 296/65.13; 280/735  
See application file for complete search history.

(56) References Cited

U.S. PATENT DOCUMENTS

| | | | |
|---|---|---|---|
| 6,851,655 B2 * | 2/2005 | Kume et al. | 248/429 |
| 6,921,107 B2 * | 7/2005 | Mills et al. | 280/735 |
| 7,322,605 B2 * | 1/2008 | Ventura et al. | 280/735 |
| 7,812,600 B2 * | 10/2010 | Ito et al. | 324/207.25 |
| 2004/0046433 A1 * | 3/2004 | Nishide et al. | 297/344.11 |
| 2004/0100388 A1 * | 5/2004 | Yoshida et al. | 340/686.1 |
| 2005/0057065 A1 * | 3/2005 | Endoh et al. | 296/65.13 |
| 2006/0226328 A1 * | 10/2006 | Matsumoto et al. | 248/429 |
| 2006/0226674 A1 * | 10/2006 | Ito et al. | 296/65.13 |
| 2007/0057527 A1 * | 3/2007 | Endo et al. | 296/65.13 |
| 2007/0164619 A1 * | 7/2007 | Greene | 310/68 B |

FOREIGN PATENT DOCUMENTS

EP 371794 A2 * 6/1990

* cited by examiner

*Primary Examiner* — James Trammell  
*Assistant Examiner* — Truc M Do  
(74) *Attorney, Agent, or Firm* — Butzel Long

(57) ABSTRACT

A vehicle seat power track for an automobile vehicle seat which includes a sensor arrangement to detect the seat position along the track relative to a front airbag apparatus and generate a signal to control the apparatus of the airbag. The vehicle seat power track also includes brackets configured to reduce horizontal movement of the track components.

12 Claims, 4 Drawing Sheets

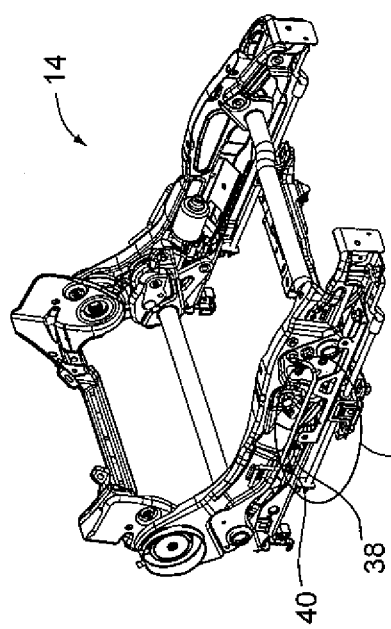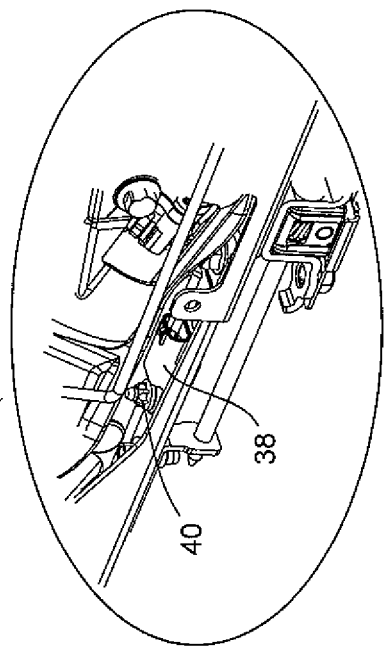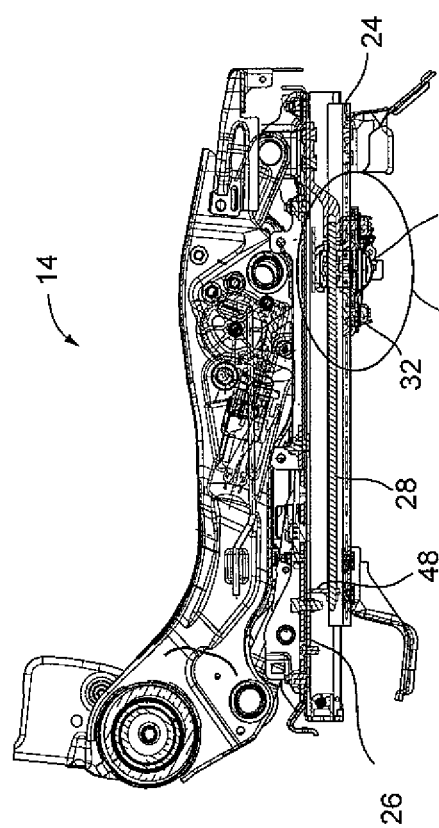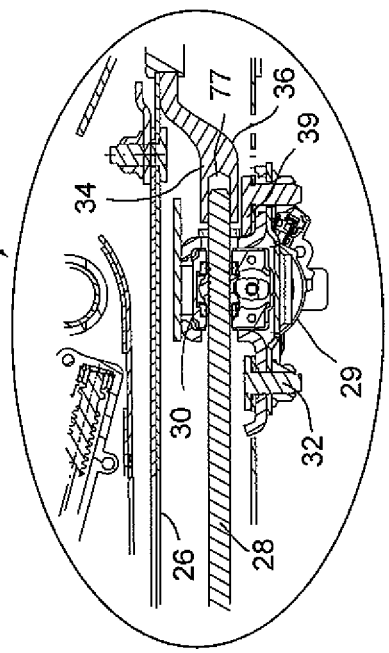

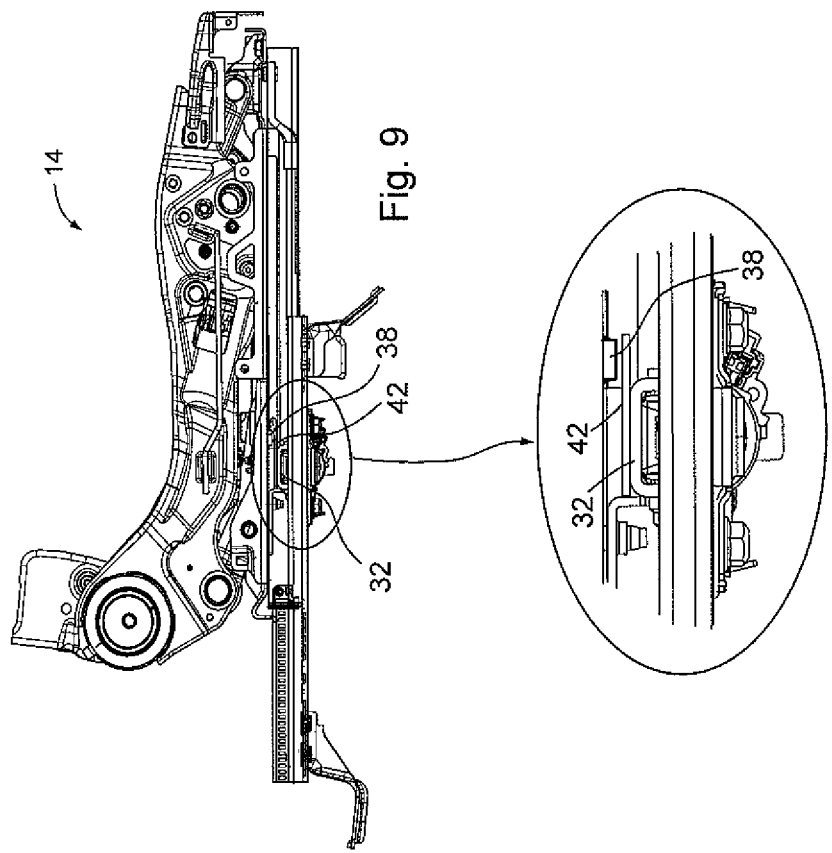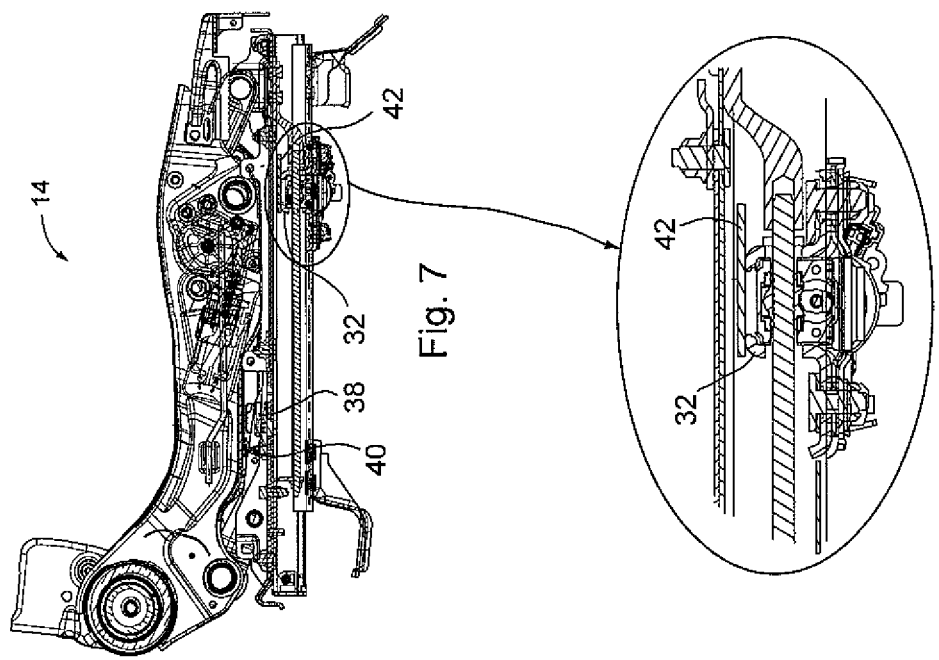

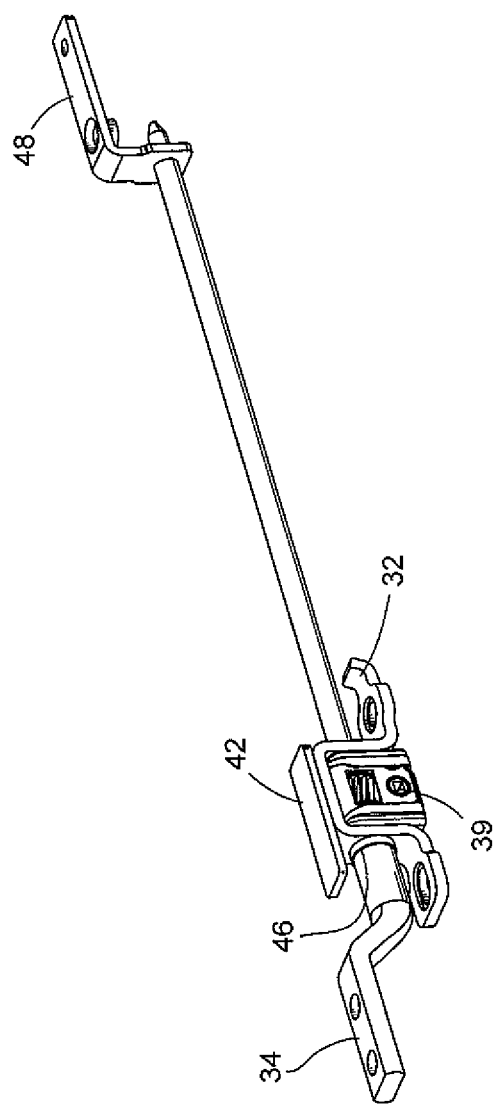
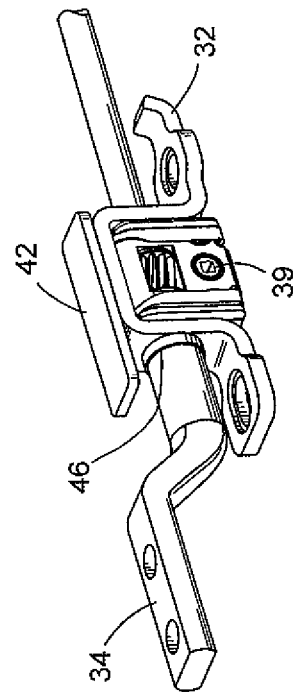
Fig. 11
Fig. 12

VEHICLE SEAT POWER TRACK ENHANCEMENTS

CROSS REFERENCE TO RELATED APPLICATIONS

The present application is a U.S. National Stage filing of International Application No. PCT/US2007/019638, filed on Sep. 10, 2007 titled "Vehicle Seat Power Track Enhancements, the entire disclosure of which is incorporated herein by reference.

BACKGROUND

The present disclosure relates generally to adjustable vehicle seat assemblies utilizing power track systems. More particularly, the present disclosure relates to enhancements to a power track system and its transmission.

Vehicle seat assemblies are typically provided with a track system that enables the forward and rearward positioning of the seat assembly. Such adjustment capability is desirable to enable vehicle operators of various sizes to be seated comfortably within the motor vehicle. Such seat assemblies typically include a track assembly including two tracks that move relative to one another and a latching mechanism that retains the tracks (and therefore the seat assembly) in a locked position relative to one another until the latch mechanism is released. The tracks may be moved relative to one another, which allows the occupant of the seat assembly to adjust the seat assembly to a new position.

Some vehicle seat assemblies include an electric motor, a transmission and a lead screw positioned within the track assembly for power adjustment of the vehicle seat. In such arrangements, the lead screw may generally be fixed and does not rotate. The transmission includes a worm gear assembly rotatably coupled to the lead screw and the electric motor causes the worm gear to rotate causing the transmission to translate along the fixed non-rotating lead screw to adjust the vehicle seat assembly forward or rearward.

In such configuration, the electric motor, mounted on a traverse beam is positioned relative to each of the tracks, for example in the center of the tracks or at one end of the tracks. A transmission mounting bracket couples the transmission, which may float inside of the mounting bracket, and the stationary lead screw to one of the rails. Thus, the strength of the power track is realized through the transmission mounting bracket. In the event of a collision, the load on the bracket could cause the bracket to bend. Using a larger bracket to provide more strength to the power track could be problematic due to space constraints inside the track section that limits the size of the mounting bracket.

Occasionally, the movement of the seat forward can place the occupant of the vehicle too close to airbags that are located in front of the occupant. In such arrangement, the power to the air bag could be diminished or turned off. Generally, it is known to provide a seat position sensor for controlling the airbag based upon seat position. However, such known seat position sensors are affected by debris (such as dirt and dust) in the passenger cabin of the vehicle.

Therefore there is a need for a stronger transmission mounting bracket that can withstand the extra load encountered in situations such as a vehicle collision. There is also a need for a compact design of a sensor arrangement that can detect the position of the seat in reference to the proximity of an airbag and adjust the airbag power down or off as needed.

SUMMARY

In one exemplary embodiment, a vehicle seat power track for an automobile vehicle seat includes a lower rail for being fixed to a vehicle floor and an upper rail for having a seat fixed thereto and the upper rail may be mounted and traveled freely with support of the lower rail. The power track system includes a lead screw member which may extend in longitudinal direction of the rails and a transmission member located inside the rails and mounted using a bracket. A motor is provided and may be coupled to the transmission member to cause movement of the transmission along the lead screw in the longitudinal direction of the track. In the exemplary embodiment, the lead screw may be mounted on the upper rail and the transmission and bracket member on the lower rail to enable relative movement of the upper to the lower rails. A position sensor may be mounted at a predetermined position on the top surface of the upper rail to detect a magnet or a plate member (or detecting cell) generating a magnetic field near the sensor. In the one exemplary embodiment, the detecting cell (plate member) is mounted on a surface of the bracket member facing a top surface of the upper rail such that when the vehicle seat is moved to a predetermined position the plate member is aligned with the seat position sensor and affects the signal status of the seat position sensor.

In one exemplary embodiment, the bracket member includes flanges extending along the lower rail and the bracket member clip front and back surfaces of the transmission.

In one exemplary embodiment, a support member fixedly couples the lead screw to the upper rail. The support member contacts a rear surface of the transmission to form a stop surface and functions to control or limit the seat movement. Further, in the one exemplary embodiment, one end of the detecting cell is aligned at the level of the stop surface of the transmission. Further, in the one exemplary embodiment, another end of the detecting cell extends, or is cantilevered, in one direction from the bracket member.

In an exemplary embodiment, the detecting cell is fixed to the bracket member using a welding process and in particular a laser welding process to minimize any welding projections from the resulting combination of the detecting cell and bracket member.

In one exemplary embodiment, the seat position sensor includes a magnet and a detection member for detecting a magnetic field.

In one exemplary embodiment, the seat position sensor is located toward a rear end of the upper rail and the bracket member and detecting cell are located toward the front end of the lower rail to detect a seat position which is a front most position and to control or prevent deployment of a front airbag. In one exemplary embodiment, the front airbag is deployed with a lower force when the seat is detected as being the front most position. In one exemplary embodiment, the front airbag is not deployed when the seat is detected as being the front most position.

BRIEF DESCRIPTION OF THE DRAWINGS

FIG. 3 is a cross section of a track system of FIG. 2 along line 3-3 according to an exemplary embodiment.

FIG. 4 is a magnified view of a track system transmission according to an exemplary embodiment.

FIG. 5 is a perspective view of a track system of FIG. 2 according to an exemplary embodiment.

FIG. 6 is a magnified view of a seat position sensor according to an exemplary embodiment.

FIG. 7 is a cross section of a track system of FIG. 2 according to an exemplary embodiment.

FIG. 8 is a magnified view of a shunt member according to an exemplary embodiment.

FIG. 9 is a cross section of a seat track system of FIG. 2 according to an exemplary embodiment.

FIG. 10 is a magnified view of a seat position sensor according to an exemplary embodiment.

FIG. 11 is a perspective view of a lead screw illustrating a spacer between the lead screw bracket and saddle bracket according to an exemplary embodiment.

FIG. 12 is a magnified view of the lead screw in FIG. 11 according to an exemplary embodiment.

DESCRIPTION

Figure 1:
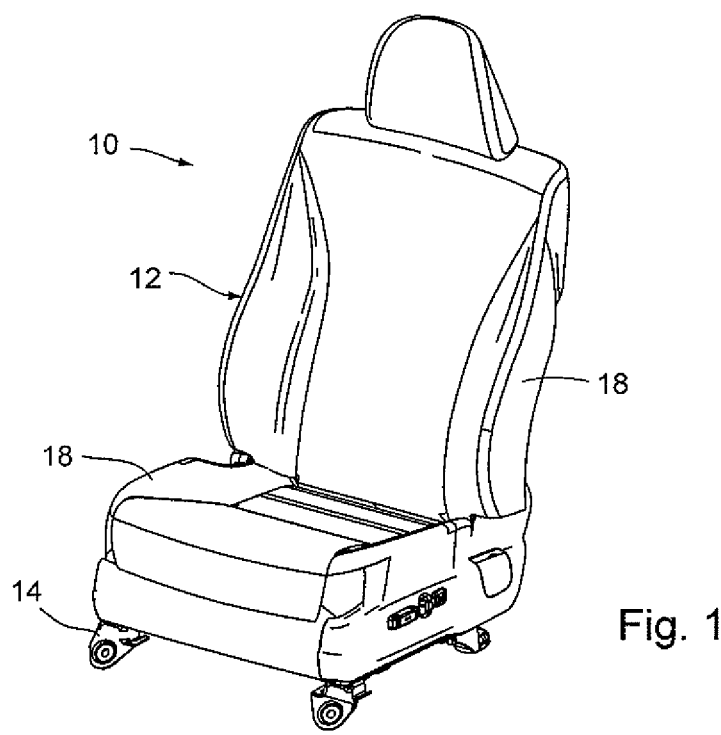
FIG. 1 is a perspective view of a seat assembly according to an exemplary embodiment.

Referring to FIG. 1, a seat assembly 10 is shown according to an exemplary embodiment. Seat assembly 10 includes a seat 12 and a track system 14. Seat 12 generally includes a back portion 16 and a seat cushion portion 18, which each may take any one of a variety of well known configurations. Track system 14 is generally configured to enable an occupant of seat 12 to adjust the position of seat 12 in forward and/or rearward directions.

Figure 2:
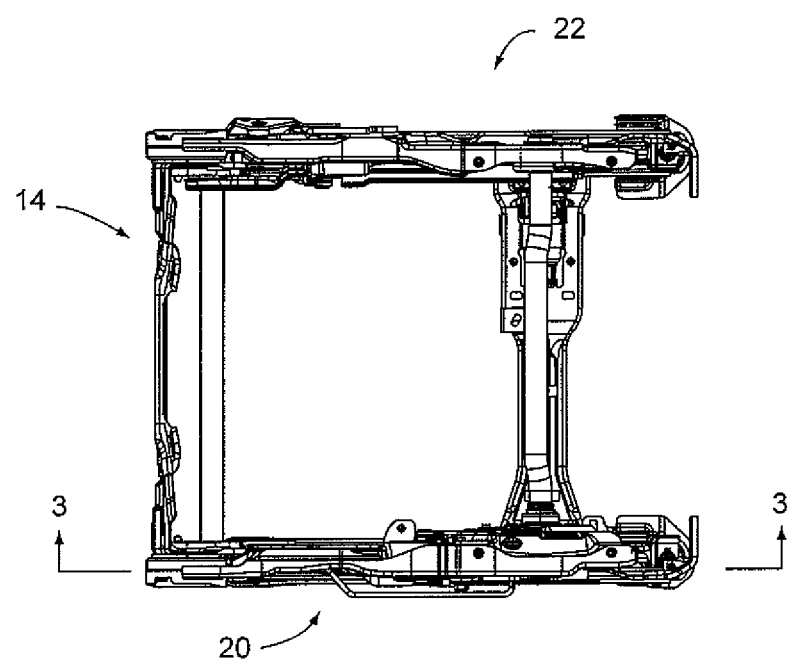
FIG. 2 is a top view of a track system as used with a seat assembly shown in FIG. 1 according to an exemplary embodiment.

Referring to FIG. 2, a track system 14 is shown according to an exemplary embodiment. Track system 14 includes an inboard track arrangement 20 and an outboard track arrangement 22. Inboard track arrangement 20 and outboard track arrangement 22 are coupled to seat cushion portion 18 (shown in FIG. 1) of seat 12 in a generally parallel relationship with inboard track arrangement 20 being located proximate the inboard side of seat cushion portion 18 and outboard track arrangement 22 being located proximate the outboard side of seat cushion portion 18.

Referring now to FIG. 3, a cross section of track system 14 illustrated in FIG. 2, is shown according to an exemplary embodiment. For simplicity, only track arrangement 20 will be described below, it being understood that the description applies equally to track arrangement 22. Track arrangement 20 includes a lower track (rail) 24 coupled to the vehicle and an upper track (rail) 26 coupled to seat 12, a lead screw 28 located between lower track 24 and upper track 26 and mounted to the upper track 26, a transmission 30 rotatably coupled to lead screw 28, and a transmission mounting bracket 32 partially enclosing the transmission 30 and movably coupled with respect to the lead screw 28 and coupled to the lower track 24. The track system 14 may also include a motor and flexible drive cables for interconnecting the motor and the transmission.

In an exemplary embodiment, a motor turns drive cables which are coupled to transmission 30 which transmits power to the lead screw 28. The lead screw 28 is fixed and does not rotate. A worm gear assembly 29 within the transmission 30 and coupled with the lead screw 28 causes transmission 30 to translate along the fixed non-rotating lead screw 28 thereby moving the vehicle seat assembly 10 forward or rearward depending upon the rotation direction.

Referring now to FIG. 4, a magnified view of transmission 30 illustrated in FIG. 3, is shown according to an exemplary embodiment. Transmission 30 causes the upper track 26 to move along the lead screw 28. In this configuration, the upper track 26 and seat 12 move relative to the lower track 26. The seat 12 may be moved in the opposite direction by reversing the direction that the motor turns. One end of the lead screw 28 is fixedly coupled to upper track 26 through the bracket or support 34 and the other end of the lead screw 28 is coupled to the upper track 26 through the bracket or support 48.

In the event excessive forces are applied to the vehicle, e.g. a vehicle collision, the load path of the force is from the seat 12 to the upper track 26 through the support 34 to the transmission mounting bracket 32. Excessive loading on the transmission mounting bracket 32 may cause the bracket to bend, putting a high load onto the transmission 30 and potentially causing it to fail.

To lessen the bending of the bracket 32, a brace portion 36 may be utilized to support the transmission mounting bracket 32 at the point of interface between the lead screw 28 and transmission 30. The brace portion 36 may be located on one or both sides of the transmission mounting bracket 32. The brace portion 36 may be highly and efficiently achieved utilizing an extension of the head 39 of the fastener 77 used to connect the transmission mounting bracket 32 to the lower track 24 thereby also providing an efficient load path back to lower track 24.

Another exemplary embodiment of track system 14 is illustrated in FIGS. 5 through 8. As mentioned above, vehicle seat 12 moves with upper track 26 forward and rearward through track system 14. Generally, the movement of seat 12 too far forward may cause the occupant of seat 12 to be located close to an airbag (not shown in the FIGURES) situated in front of the occupant, such as a driver's position in a passenger vehicle. To determine the location of seat 12 relative to an airbag, a seat position sensor 38 may be mounted to the upper track 26 using an attachment nut 40. The seat position sensor 38 detects the location of the seat 12 relative to a shunt (plate) member or detecting cell 42 affixed to the top of transmission mounting bracket 32. The shunt (plate) member 42 may be a magnet. Seat position sensor 38 may be affixed to the top of the upper rail of the track assembly and the shunt plate 42 may be coupled to the transmission mounting bracket 32. The shunt plate 42 may be coupled to the transmission mounting bracket 32 using a laser weld process to prevent weld matter from extending from the laser welded surfaces. Alternatively, the shunt plate 42 may be coupled to the transmission mounting bracket 32 using other appropriate materials such as adhesives or other welding procedures.

Referring now to FIG. 7, the seat position sensor 38 is located at the rear end of the track system 14 given the particular seat position. In this vehicle seat position, the shunt member 42 is not located near the seat position sensor 38. Therefore, the seat position sensor 38 is considered "off" in proximity to the shunt plate 42 and the seat position sensor 38 will send a signal to the airbag to remain on or in full power mode or, alternatively, the seat position sensor 38 will not prevent activation of the airbag.

As the seat 12 moves forward, the seat position sensor 38 will be positioned aligned over the shunt member 42, as best illustrated in FIGS. 9 and 10. When the seat position sensor 38 is over the shunt member 42, the seat is considered in full forward position. In this position, the seat position sensor 38 is considered "on" in proximity to the shunt plate and the airbag will receive a signal to power down or turn off due to the close proximity of the occupant.

In the exemplary embodiment shown, the seat position sensor 38 and shunt plate 42 located inside the seat rails allow for utilization of a narrow space within the seat rails as well as for sensing of the seat position. With the sensor or shunt 42 located inside of the slide rail, foreign objects may be prevented from entering the seat position sensor thereby improving the accuracy of detection of the full forward seat position and limiting the affects of foreign objects and dirt and dust since the sensor is set on the top surface of the upper rail. The seat position sensor 38 and shunt plate 42 design provide greater flexibility in design for the vehicle seat.

In an exemplary embodiment, as illustrated in FIGS. 11 and 12, an annular ring, or spacer 46 may be located between the lead screw bracket 48 and transmission mounting bracket 32. Spacer 46 may function as a stopping member to minimize the force felt by the occupant when the track assembly comes to a stop. Spacer 46 may be comprised of any non-metallic, resilient flexible material such as Acetal (POM) Copoly (Acetal (POM) Copolymer) plastic material available as CELCON™ M90 available from Ticona Company in Florence, Ky., USA.

For purposes of this disclosure, the term "coupled" means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components or the two components and any additional member being attached to one another. Such joining may be permanent in nature or alternatively may be removable or releasable in nature.

It should be noted that the construction and arrangement of the track system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes and omissions may be made in the design, operating conditions and arrangement of the various exemplary embodiments.

What is claimed is:

1. A vehicle seat power track for an automobile vehicle seat in a vehicle comprising:
   a lower rail secured to a vehicle;
   an upper rail having an upper surface wherein, the upper rail supports the vehicle seat, and travels with support of the lower rail:
   a lead screw member coupled to one of the upper and lower rails and disposed between the lower and upper rails and extending in the longitudinal direction of the rails;
   a transmission member including a mounting bracket coupled to the lead screw and positioned between the rails, the mounting bracket including a shunt;
   a motor coupled to the transmission member to move the transmission along the lead screw and to adjust the lower and upper rails with respect to one another thereby adjusting the position of the vehicle seat; and
   a position sensor coupled to the top surface of the upper rail to sense the shunt to generate a signal indicating a position of the vehicle seat, wherein the lead screw member is coupled to one of the upper and lower rails by a lead screw bracket, and further comprises a spacer located between the lead screw bracket and the mounting bracket for the transmission, the spacer functioning as a stopping member to minimize force on a seat occupant when the track assembly comes to a stop.

2. The vehicle seat power track of claim 1 further comprising a first bracket for mounting one end of the lead screw to the upper rail and a second bracket for mounting the other end of the lead screw to the upper rail and the transmission and the mounting bracket are coupled to the lower rail to enable relative movement of the upper rail to the lower rail.

3. The vehicle seat power track of claim 2 wherein the position sensor responds to a magnetic field generated by the shunt, and the shunt includes a magnet and a detecting cell located proximate the position sensor.

4. The vehicle seat power track of claim 3 wherein first and second support member couples the lead screw to the upper rail.

5. The vehicle seat power track of claim 4 wherein the first support member contacts a rear surface of the transmission to form a stop surface and control the seat movement.

6. The vehicle seat power track of claim 3 wherein one end of the shunt is aligned at the level of the stop surface of the transmission.

7. The vehicle seat power track of claim 1 wherein one end of the shunt extends in one direction from the mounting bracket.

8. The vehicle seat power track of claim 1 wherein the shunt is coupled to the mounting bracket by a laser welding.

9. The vehicle seat power track of claim 3 wherein the shunt is welded to the mounting bracket to minimize any welding projections from the resulting combination of the shunt and mounting bracket.

10. The vehicle seat power track of claim 4 including a spacer coupled to the lead screw proximate the transmission mounting bracket and located between the transmission mounting bracket and one of the lead screw support members to provide a stop.

11. The vehicle seat power track of claim 1 wherein the spacer is comprised of a non-metallic material.

12. The vehicle seat power track of claim 1 wherein the spacer is comprised of a material selected from the group consisting of polyoxymethylene (POM) homopolymers and polyoxymethylene copolymers.

* * * * *